United States Patent [19]

Koether

[11] 4,220,981
[45] Sep. 2, 1980

[54] PORTABLE FLOODLIGHTING EQUIPMENT

[75] Inventor: Herbert F. Koether, Denver, Colo.

[73] Assignee: Over-Lowe Company, Inc., Englewood, Colo.

[21] Appl. No.: 896,446

[22] Filed: Apr. 14, 1978

[51] Int. Cl.² .......................... F21L 15/08; F21M 1/00
[52] U.S. Cl. ...................................... 362/61; 362/238; 362/250; 362/252; 362/403; 362/431
[58] Field of Search ...................... 362/1, 61, 227, 233, 362/238, 240, 249, 250, 252, 403, 431

[56] References Cited

U.S. PATENT DOCUMENTS

| | | | |
|---|---|---|---|
| 3,381,118 | 4/1968 | Widner | 362/61 |
| 3,463,916 | 8/1969 | De Bella | 362/403 |
| 3,586,270 | 6/1971 | Loffler et al. | 362/61 |
| 3,949,218 | 4/1976 | Hayward | 362/233 |

FOREIGN PATENT DOCUMENTS 1507965  11/1967  France ...................................... 362/250

Primary Examiner—Howard A. Birmiel
Attorney, Agent, or Firm—Wm. Griffith Edwards

[57] ABSTRACT

A portable floodlighting unit of the type having an extensible mast mounted on a vehicular body for transportation and collapsible into a horizontal position on the body is provided with two collapsible masts at diagonally opposite corners of the vehicle. East mast is provided with a frame carrying a battery of floodlights. Floodlighting at high intensity on all sides of the vehicle is made possible, and if desired all the lights may be positioned to light an area at one side of the vehicle.

5 Claims, 5 Drawing Figures

PORTABLE FLOODLIGHTING EQUIPMENT

SPECIFICATION

This invention relates to readily portable floodlighting units for illuminating outdoor work areas and particularly to an improved floodlighting equipment for effecting floodlighting of all the areas around the vehicle or selected positions thereof.

Portable floodlighting equipment for the illumination of outdoor work areas commonly comprises a vehicle, trailer or the like carrying one or more floodlights mounted at the top of an extensible mast. The mast may be collapsed for storage on the vehicle during transportation and may be pivoted into a horizontal position for this purpose. By way of example, the following patents illustrate the prior art: U.S. Pat. Nos. 2,899,540, Allmand et al; 3,463,916, DeBella; 3,381,118, Widner; and Re. 28,041, Loeffler et al. While such lighting equipment has proved acceptable for a wide range of uses, it has not been fully adequate for all applications. Accordingly, it is an object of the present application to provide an improved floodlighting equipment which is more easily adapted to a wider range of use than the presently available equipment.

It is a further object of this invention to provide a portable floodlighting equipment including an improved arrangement for effecting the selective illumination of the entire area about the equipment.

Briefly, in carrying out the objects of this invention in one embodiment thereof, a portable floodlighting equipment is provided which includes a base or main frame mounted on vehicle wheels and supporting a source electric energy for the lights. A superstructure is provided on either side of the motor generator unit extending longitudinally of the frame and two extensible masts are mounted, one at each end of the equipment and diagonally from one another. The masts are pivotally mounted at the upper portion of the superstructure and when collapsed may be supported against respective cradles and secured for purposes of transportation. A light assembly is provided for attachment to the top of each mast and each assembly includes a longitudinal cross member and a battery of lights supported thereon, each light being individually movable over a substantial angle and in all directions and the supporting frames being rotatable about the axes of the masts. The lighting units mounted in this fashion may be supported at the tops of the masts and directed either both toward one side or one toward each side or at selected positions entirely around the equipment. A single motor generator unit is provided to energize the lights on both masts.

The features of novelty which characterize this invention are pointed out in the claims annexed to and forming a part of this specification. The invention itself, however, both as to its organization and manner of operation, together with further objects and advantages thereof, may best be understood upon reference to the following description taken in connection with the accompanying drawings in which:

Figure 1:
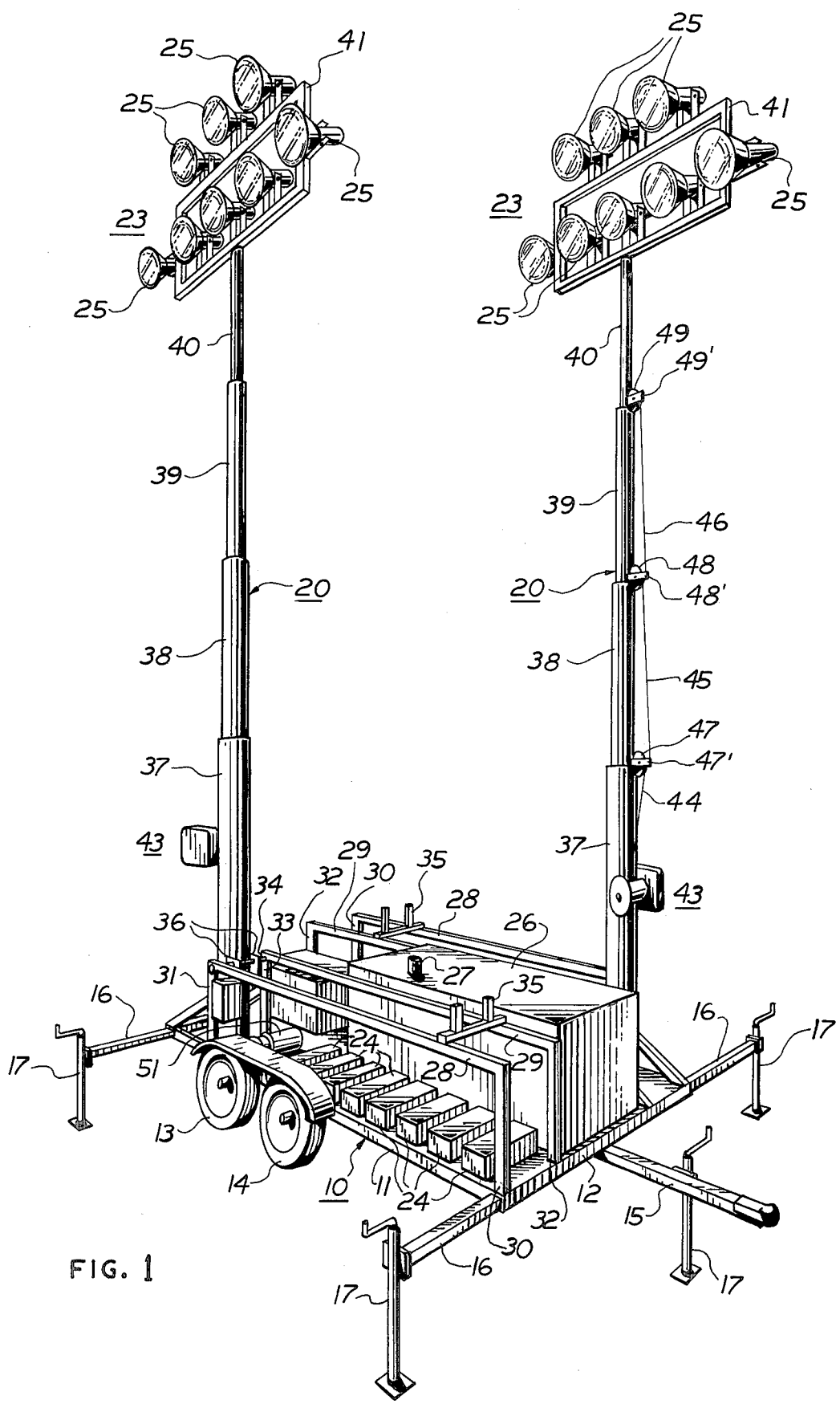
FIG. 1 is a perspective view of a lighting equipment embodying the invention illustrated with the lights mounted on the masts in their elevated positions.
Figure 2:
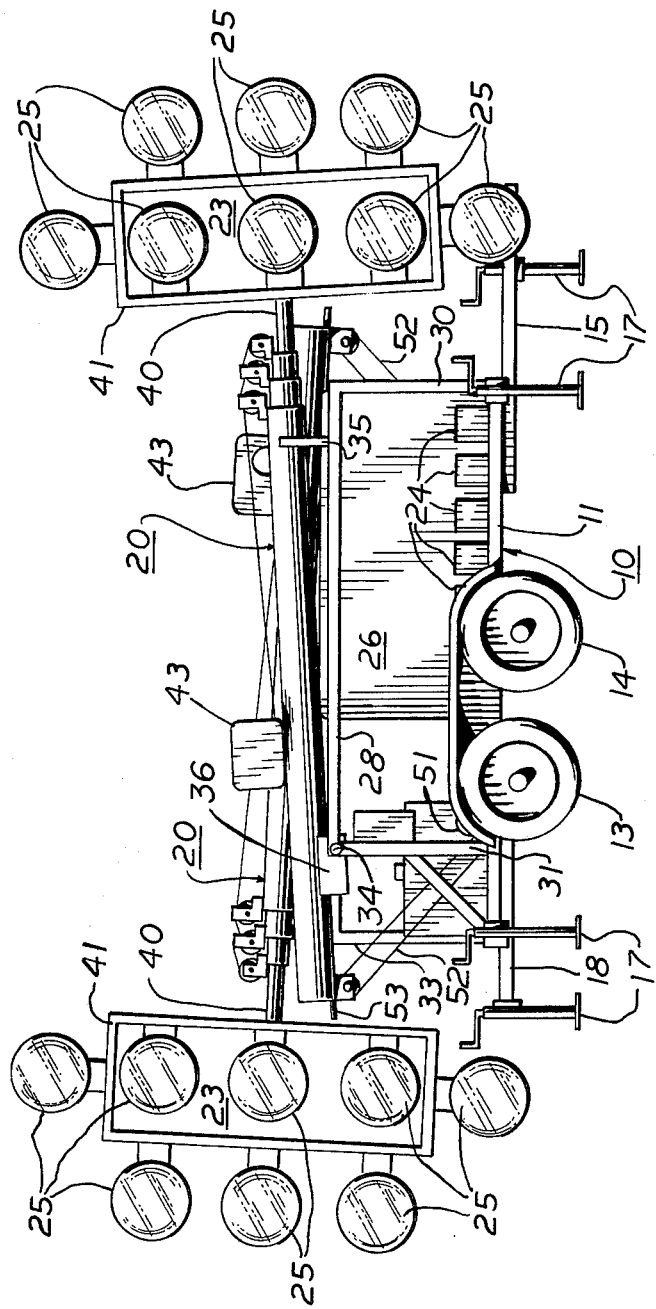
FIG. 2 is a side-elevation view of the equipment of FIG. 1 shown with the masts collapsed and in their positions on the body of the equipment.
Figure 3:
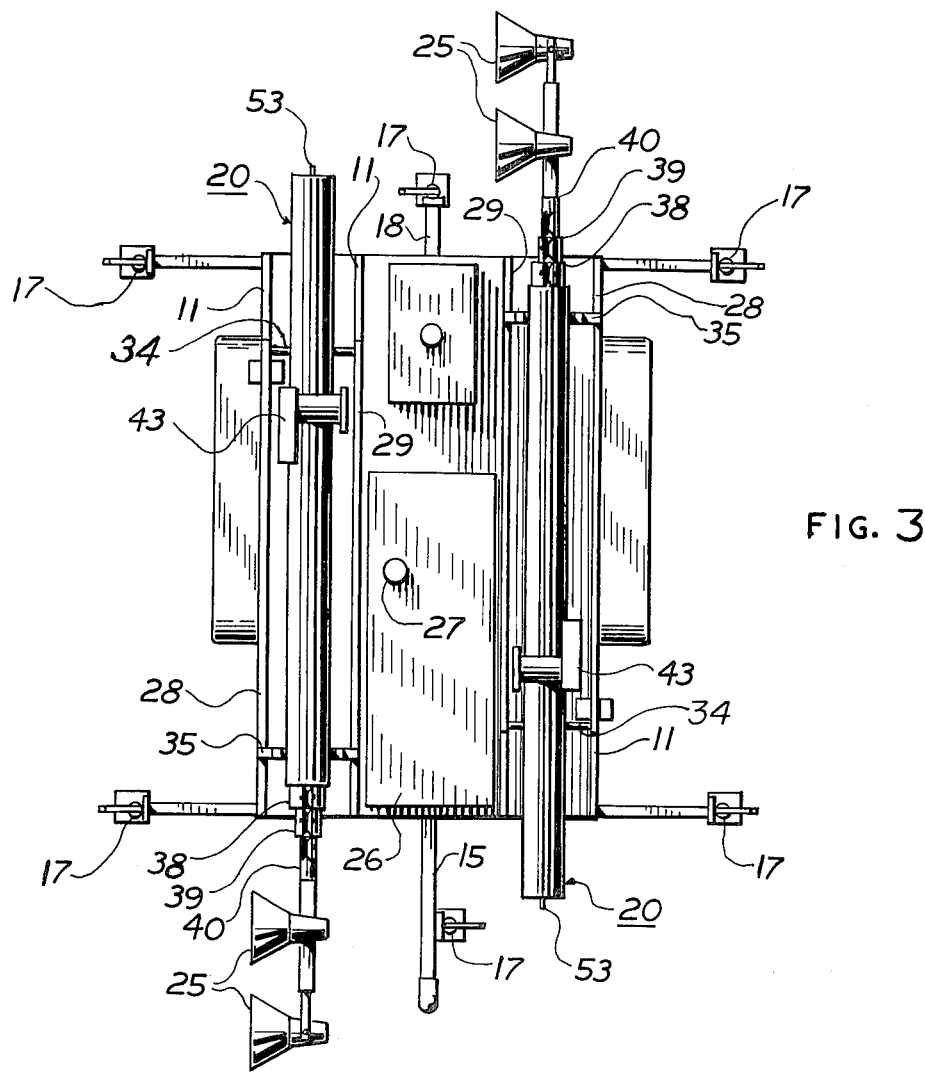
FIG. 3 is an end-elevation view of the equipment as shown in FIG. 2.
Figure 4:
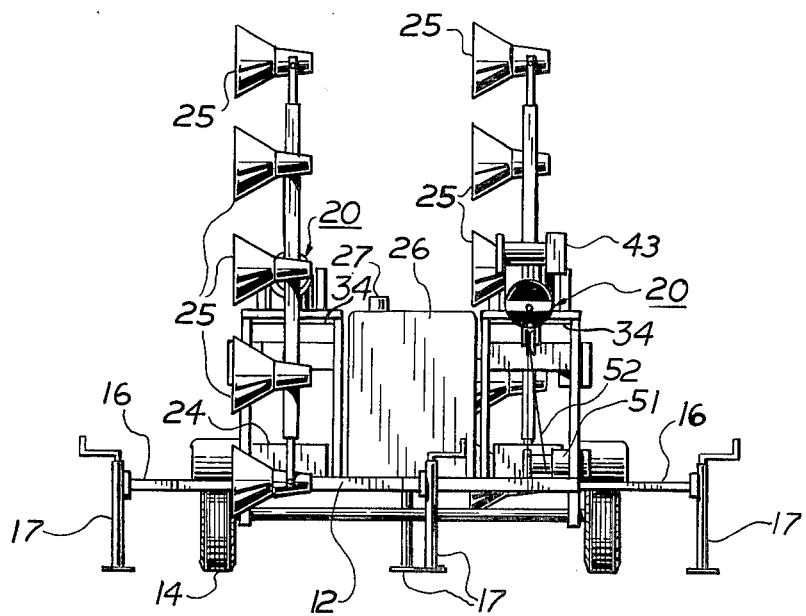
FIG. 4 is a top plan view of the equipment as shown in FIG. 2.

Referring now to the drawings, the portable floodlighting equipment illustrated in FIGS. 1, 2, 3, and 4 comprises a main body or platform member 10 constructed of longitudinal frame members, one of which is shown at 11, and lateral frame members, one of which is shown at 12. Additional longitudinal frame members (not shown) extend between the end members 12 to provide adequate support for the equipment mounted on the body. The body is mounted on pairs of trailer wheels 13 and 14 rotatably mounted on suitable axles below and across and secured to the body 10. A drawbar 15, rigidly secured to the body 10, is provided for towing the equipment. As shown in FIG. 1, outriggers or braces 16 are provided which extend laterally from the ends of the body 10 and are slidably mounted in the frame members 12 which are hollow rectangular members. The members 16 carry adjustable jacks 17 for providing the lateral support for the equipment when it is installed in its working position. A third jack 17 is attached to the drawbar 15 and a fourth jack not shown in FIG. 1 is secured on a central longitudinally extensible bar 18 as shown in FIGS. 2 and 3. All of the jacks cooperate to maintain the equipment in stable position, particularly when two collapsible masts, indicated at 20, are extended as shown in FIG. 1. These masts are of identical construction and are mounted at opposite or diagonal corners of the base 10. Floodlight assemblies 23 have been shown mounted on the tops of the masts 20, each having eight floodlights 25.

Power for energizing the lights 25 is supplied from a gasoline or diesel engine driven generator (not shown) which is mounted on the platform 10 within a housing 26, the exhaust pipe of the engine being indicated at 27. Extensible electric cables (not shown) are provided for conducting the power along the masts and to the individual lights of the assemblies, each light being connected to its respective cable leads by detachable leads (not shown). The lights may be mercury vapor or metal halide lamps, and each light is provided with a respective starting ballast 24' a number of which are shown in FIGS. 1 and 2.

The masts 20 are secured on the base 10 on superstructures comprising spaced outer and inner longitudinal frame members 28 and 29, members 28 being supported on vertical legs 30 at their ends remote from the masts and on vertical legs 31 at the mast ends. In a similar manner the vertical members 29 are supported by vertical legs 32 and 33. A rod or shaft 34 is securely mounted on the superstructure at the upper ends of the vertical members 31 and 33 and cross members 35 are rigidly secured between the bars 28 and 29 near the other ends of the superstructures, these cross members providing a cradle for the masts to rest upon and be secured when in their lowered positions. The masts 20 are pivoted on the rods 34 through plates or lugs 36 welded or otherwise secured to the masts and through which the rods pass.

Each of the masts 20 comprises four telescoping sections 37, 38, 39 and 40. Each of the lighting assemblies 23 comprises an elongated rectangular frame 41 detachably secured to the top of the section 40 of the mast and rotatable with respect thereto; the frame may be locked in its selected position by a set screw (not shown). A short post or stub 42 is provided on the bottom frame member to fit in the top of the mast section 40.

Each of the masts 20 is provided with an electric motor driven winch 43, securely mounted on the section 37 and arranged to raise the mast to its extended position by operation of a series of cables 44, 45 and 46 which pass around pulleys 47, 48 and 49, respectively. Pulleys 47, 48 and 49 are rigidly secured to the tops of the sections 37, 38 and 39, respectively. Cables 44, 45 and 46 are connected at their outer ends, respectively, to the winch 43 and to the fixed brackets 47' and 48' of the pulleys 47 and 48. The other ends of the cables 44, 45 and 46 within the mast are connected, respectively, to the bottom ends of the mast sections 38, 39 and 40. When the winch is operated to draw the cable 44 downwardly, the section 38 is lifted within the section 37 and as it moves up the cable 45 which is rigidly attached to the support of the pulley 47 raises the section 39 as the section 38 rises. Similarly the section 40 is raised within the section 39 when the cable 46 raises the section 40 on lifting of the pulley 49. The masts may be lowered upon reversing of the winch 43. While the mast is raised a suitable lock (not shown) which secures the sections 37 and 38 against movement is actuated to prevent lowering of the mast even though the winch should be slacked off or reversed.

When it is desired to lower the masts from the position of FIG. 1, the lock is released and the winch 43 operated to allow the sections 38, 39 and 40 of the mast to telescope downwardly into their respective positions. After the mast has been collapsed, its lowermost end is released from the bolt or other mechanism securing it to the structure of the body 10 and the winch 51 is then reversed to let out a cable 52 shown in FIGS. 2 and 3 and allow the mast to swing downwardly against the tension of the cable until its rests in position on the cradle 35. As shown in FIGS. 2 and 3, the mast has a lug or extension 53 at its lowermost end which is provided with a hole 54 and may be bolted to a structural member of the body 10.

After the masts have been collapsed and lowered, they are resting in the positions generally parallel to the ground as indicated in FIG. 2 with the upper ends of the masts located adjacent respective opposite ends of the body 10. When the masts are in their lowered positions, the jacks 17 may be lifted and the vehicle wheeled to other positions about the location without requiring the removal of the lamp assemblies from the masts.

Figure 5:
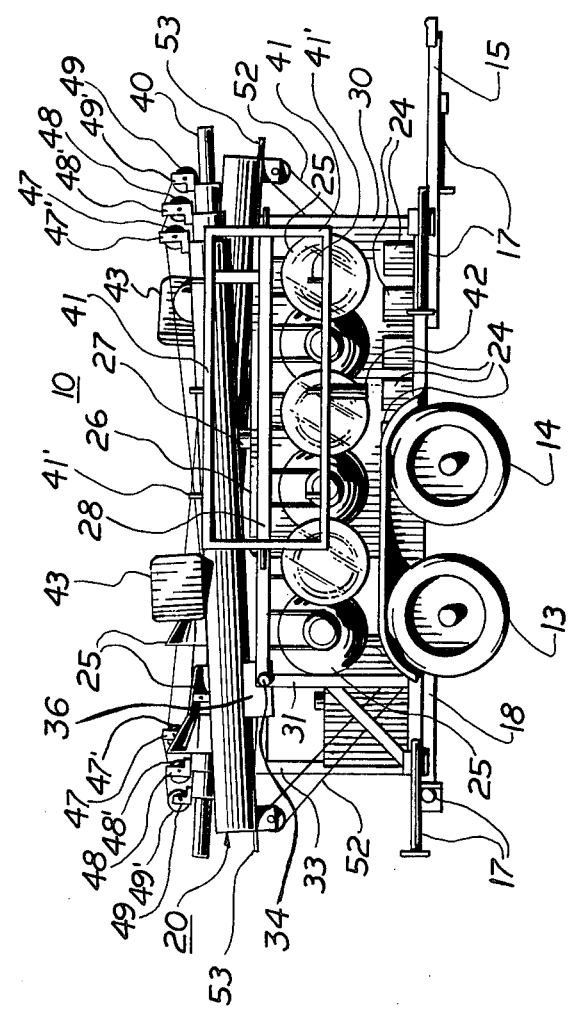
FIG. 5 is a view similar to FIG. 2 showing the masts and the lights in their stored positions on the superstructure of the equipment.

When it is desired to transport the equipment to a different location, the light assemblies 23 are removed from the mast sections 40 and the individual lights are removed from their pivot posts 41' on the frames 41 and are stored within the superstructure of the equipment as indicated in FIG. 5, the end lamps in each of the assemblies being stored separately on top of the superstructure. The frames 41 are placed against the superstructure and are bolted or otherwise secured to the outer faces of the longitudinal support members 28. The remaining lights are secured in their positions as shown in FIG. 5 by bolting their supporting frames to the cross members 28 and 29 in alternate positions as shown. The light assemblies for the other mast are similarly stored on the opposite side of the equipment.

All of the lights are provided with mountings so that they may be pivoted about an axis normal to the frame 41 when in position on the mast and they may also be pivoted about axes parallel to the adjacent frame member and may be secured in their selected positions. Thus the lights may be moved through a wide range of positions and may be secured in position according to the selected portion of the area to be lighted. Because the frames 41 may be rotated to any selected positions, the two light assemblies may be used in the manner shown in FIG. 1 to light an area at one side of the equipment 10 so that there is high intensity illumination at that side. The pattern of lighting about this side may, of course, be adjusted by changing the positions of the individual lights. For other uses it may be desirable to employ one of the assemblies to light the area on one side of the vehicle and the other on the other side of the vehicle, and for this purpose one of the frames 41 is rotated so that the lights face the other side of the vehicle. In this position, by selecting the positions of the individual lights, it is possible to provide floodlighting for the entire area around the vehicle. The arrangement of the two masts in spaced positions on a common vehicle with a common source of power makes it possible to provide high illumination about the area in which the vehicle is located and also to intensify the illumination over any selected part of that area.

The arrangement of the masts whereby they are both collapsed and rotated downwardly into position on the vehicle provides a compact arrangement for dual equipment while utilizing a single piece of equipment for the uniform floodlighting of a large zone. The arrangement of the two masts collapsible and foldable in opposite directions longitudinally of the vehicle provides a convenient and safe arrangement for transporting the light assembly and affords the energizing of the lights and winch motors by a single generator and control equipment.

While the invention has been described in connection with a single embodiment thereof, other applications and modifications will occur to those skilled in the art, therefore, it is not desired that the invention be limited to the specific arrangement disclosed and it is intended by the appended claims to cover all modifications which fall within the spirit and the scope of the invention.

I claim:

1. In a portable lighting equipment of the type having a body mounted on vehicle wheels and an extensible mast for carrying lights and for holding the lights in elevated positions for floodlighting an area adjacent the equipment and wherein the mast when lowered for storage or transportation is pivoted into a position longitudinally of the body and generally parallel to the ground or supporting surface, the improvement which comprises a first extensible mast mounted on the body adjacent one end and toward one side of the body, a second extensible mast mounted adjacent the other end of the body and toward the other side thereof diagonally of the body from the first mast whereby said masts upon being lowered and pivoted more in spaced parallel vertical planes, each of said masts having at its upper end a light assembly having a plurality of lights thereon, said upper ends of said masts in their lowered positions being located adjacent respective opposite ends of said body, and means for positioning said lights to direct light from the assembly on each mast to selected areas about said equipment whereby the area on either side of said equipment may be lighted by both light assemblies or the lights may be directed to selected portions in the entire area surrounding the equipment.

2. A portable lighting equipment as set forth in claim 1 including a single motor generator unit mounted on said body for supplying the electric power to said light assemblies on both said masts.

3. A portable lighting equipment as set forth in claim 1 wherein said light assemblies are rotatable about their respective masts to any selected position, and each assembly includes a frame extending transversely of its respective mast, said lights being mounted on said frame and being adjustable to direct light over selected portions of the adjacent area and said frames being rotatable on said masts about the mast axis.

4. A portable lighting equipment as set forth in claim 3 wherein each of said frames has a length of the order of the width of said body and said masts in their lowered positions on said body extend beyond said body and said frames with said lights thereon may be rotated to vertical positions extending over the ends of said body whereby said equipment may be moved for relocation without removing said light units from said masts.

5. A portable lighting equipment as set forth in claim 4 wherein said lights and said frames are removable from said masts and including means on said body for securing and storing said lights and said frames for transportation.

* * * * *